US006440255B1

(12) United States Patent
Kohlhammer et al.

(10) Patent No.: US 6,440,255 B1
(45) Date of Patent: Aug. 27, 2002

(54) PROCESS FOR PRODUCING FAST CURING MOLDING COMPOUNDS BONDED WITH PHENOLIC RESIN

(75) Inventors: Klaus Kohlhammer, Marktl; Claudia Schmidt, Altoetting, both of (DE)

(73) Assignee: Wacker-Chemie GmbH, Munich (DE)

( * ) Notice: Subject to any disclaimer, the term of this patent is extended or adjusted under 35 U.S.C. 154(b) by 0 days.

(21) Appl. No.: 09/447,482

(22) Filed: Nov. 23, 1999

(30) Foreign Application Priority Data

Nov. 24, 1998 (DE) .......................... 198 54 207

(51) Int. Cl.$^7$ .......................... C08G 8/28; C08K 5/105; B32B 31/20
(52) U.S. Cl. ........... 156/283; 156/62.2; 156/296; 156/332; 156/335; 264/112; 264/122
(58) Field of Search ............... 156/62.2, 283, 156/332, 335, 296; 264/112, 122

(56) References Cited

U.S. PATENT DOCUMENTS

| 3,434,997 A | | 3/1969 | Schmoll et al. |
| 3,600,353 A | * | 8/1971 | Baker |
| 3,969,558 A | * | 7/1976 | Sadashige ............... 428/58 |
| 4,044,197 A | | 8/1977 | Wiest et al. |
| 4,109,057 A | | 8/1978 | Nakamura et al. |
| 4,112,188 A | | 9/1978 | Dahms |
| 4,125,502 A | * | 11/1978 | Nakamura et al. ......... 260/29.3 |
| 4,426,484 A | | 1/1984 | Saeki et al. |
| 4,612,224 A | | 9/1986 | Davis |
| 5,223,587 A | | 6/1993 | Tsuruta |
| 5,777,015 A | | 7/1998 | Jakob et al. |

FOREIGN PATENT DOCUMENTS

| AU | 22974/88 | 4/1989 |
| CH | 497 245 | 10/1970 |
| DE | 4331656 | 9/1994 |
| DE | 195 45 608 | 6/1997 |
| EP | 0389893 | * 10/1990 |
| EP | 0687317 | 11/1996 |
| FR | 1518113 | 2/1968 |
| GB | 1161885 | 8/1969 |
| WO | 93/08223 | 4/1993 |

OTHER PUBLICATIONS

Encyclopedia of Polymer Science & Engineering, 2$^{nd}$ Edition, vol. 11 p. 77 & vol. 17, pp. 406–409.*
European Search Report.
Derwent Abstract corresponding to DE 4331656 (AN 1994–286789 [36]).
Derwent Abstract corresponding to EP 687317 (AN 1994–280617 [35]).
Derwent Abstract corresponding to FR 1518113 (AN 1968–92216P [00]).

* cited by examiner

Primary Examiner—Sam Chuan Yao
(74) Attorney, Agent, or Firm—Brooks & Kushman P.C.

(57) ABSTRACT

A process is provided for producing fast curing bonded with phenolic resin, which comprises pulverulent phenolic resins mixed with or applied to the substrate to be adhered together with pulverulent addition polymers selected from the group consisting of polyvinyl alcohols and addition polymers, stabilized by hydroxyl-containing protective colloids of at least one monomer selected from the group consisting of the vinyl esters of branched or unbranched carboxylic acids of 1 to 12 carbon atoms, the esters of acrylic acid and methacrylic acid with branched or unbranched alcohols of 1 to 12 carbon atoms, vinylaromatics, vinyl halides, olefins and dienes, and subsequently, by the employment of elevated temperature and optionally elevated pressure, cured and processed into a shaped article.

21 Claims, No Drawings

PROCESS FOR PRODUCING FAST CURING MOLDING COMPOUNDS BONDED WITH PHENOLIC RESIN

BACKGROUND OF THE INVENTION

1) Field of the Invention

This invention is directed to a process for producing fast curing bonded with phenolic resin by employing, molding compounds together with pulverulent phenolic resins, pulverulent addition polymers selected from the group consisting of polyvinyl alcohols and addition polymers stabilized by hydroxyl-containing protective colloids.

2) Background Art

The importance of thermosetting phenol-formaldehyde resins, for example, hexa novolaks or resoles, as binders for a very wide variety of applications has greatly increased in recent years. Typical applications are, for example, binders in filter papers, foundry sand, ceramics, fiber mats and wood fiber boards. The use of phenol-formaldehyde resins as a thermosetting binder in most cases requires a thermally initiated, intensive crosslinking of the polymer chains to form a three-dimensional, molecular network.

In the interests of industrial use, where fast cycle times are important, development work has concentrated in particular on accelerating the crosslinking reaction, the curing, of these polymer systems.

Many prior artisans were concerned with catalyst systems which accelerate the condensation of phenol functions with aldehyde functions and were particularly interested in achieving a chemical reaction in the ortho position of the phenol ring. Examples thereof are known from WO-A 93/08223, which describes solvent-free, solid hotmelt adhesive systems with divalent metal salts as catalysts. The disadvantage here is the excess of up to 1.7 mol% of free formaldehyde which can lead to environmental problems.

U.S. Pat. No. 4,112,188 describes a process for accelerating the cure of resoles by means of boron compounds. But this process utilizes not solid, but liquid systems in aqueous solution.

The curing reaction of binder mixtures based on phenolic resin can also be accelerated by ester compounds. For example, DE-A4331656 (Derwent Abstract AN 94-286789), discloses that triacetin is useful as a cure accelerator. However, this system works only in aqueous solution and in the presence of lignin. Similarly, the Australian patent specification AU-B-22974/88 describes ester compounds, especially lactones, organic carbonates and carboxylic esters as useful cure accelerators for the liquid phenolic resins known as resoles.

Polymeric cure accelerators are likewise known. U.S. Pat. No. 5,223,587 claims a binder for wood fibers which is comprised of a powdery mix of highly condensed phenolic resins, incompletely cured phenolic resins (hexanovolaks) and optionally, coconut shell powder. U.S. Pat. No. 4,426,484 discloses accelerating the curing of solid resoles by adding solid novolak resins comprising resorcinol. The disadvantage with either process is the increased emission of formaldehyde and phenol from the starting materials used. In contrast, the use of powdered green tea, as known from U.S. Pat. No. 4,109,057, offers an environmentally benign alternative to accelerating the cure of phenolic resins by means of polymeric compounds. However, the high cost is a decisive bar to industrial use.

SUMMARY OF THE INVENTION

It is an object of the present invention to provide a process whereby the curing of solid phenolic resins, especially hexanovolaks, is accelerated.

It has now been found, surprisingly, that polyvinyl alcohols and addition polymers stabilized by hydroxyl-containing protective colloids accelerate the curing of phenolic resins.

The invention accordingly provides a process for producing fast curing bonded with phenolic resin, molding compounds which comprises pulverulent phenolic resins being mixed with or applied to the substrate to be adhered together with pulverulent addition polymers selected from the group consisting of polyvinyl alcohols and addition polymers, stabilized by hydroxyl-containing protective colloids, of one or more monomers from the group of the vinyl esters of branched or unbranched carboxylic acids of 1 to 12 carbon atoms, the esters of acrylic acid and methacrylic acid with branched or unbranched alcohols of 1 to 12 carbon atoms, vinylaromatics, vinyl halides, olefins and dienes, and subsequently, by the employment of elevated temperature and optionally elevated pressure, cured and processed into a shaped article.

DESCRIPTION OF THE PREFERRED EMBODIMENTS

Suitable polyvinyl alcohols are partially or fully hydrolyzed polyvinyl alcohols, preferably having a degree of hydrolysis of 85 to 100 mol% and a Höppler viscosity of 1 to 60 mPas, measured in 4% strength aqueous solution (method of Höppler at 20° C., DIN 53015). It is also possible to use vinyl alcohol copolymers which, in addition to the vinyl alcohol and vinyl acetate units, contain other monomer units, for example 1-methylvinyl acetate or 1-methylvinyl alcohol units, preferably in an amount of 0.5 to 10% by weight, based on the total weight of the copolymer. The vinyl alcohol homo- and copolymers mentioned are commercially available or obtainable in a manner known to one skilled in the art, by hydrolysis or alcoholysis of the corresponding vinyl acetate homo- and copolymers.

Vinyl esters preferred for the protective colloid-stabilized addition polymers are vinyl acetate, vinyl propionate, vinyl butyrate, vinyl 2-ethylhexanoate, vinyl laurate, 1-methylvinyl acetate, vinyl pivalate and vinyl esters of alpha-branched monocarboxylic acids of 9 to 11 carbon atoms, for example VeoVa9® or VeoVa10® (trade names of Shell). Vinyl acetate is particularly preferred.

Methacrylic esters or acrylic esters preferred for the protective colloid-stabilized addition polymers are methyl acrylate, methyl methacrylate, ethyl acrylate, ethyl methacrylate, propyl acrylate, propyl methacrylate, n-butyl acrylate, n-butyl methacrylate, 2-ethylhexyl acrylate. Particular preference is given to methyl acrylate, methyl methacrylate, n-butyl acrylate and 2-ethylhexyl acrylate.

Preferred vinylaromatics are styrene, methylstryene and vinyltoluene. The preferred vinyl halide is vinyl chloride. The preferred olefins are ethylene and propylene and preferred dienes are 1,3-butadiene and isoprene. Optionally, 0.05 to 10.0% by weight, based on the total weight of the monomers, or comonomers can be present in addition, for example acrylic acid, acrylamide, vinylsulfonic acid, 2-acrylamidopropanesulfonate, vinyltriethoxysilane, gamma-methacryloyloxypropyltriethoxysilane, N-methylolacrylamide (NMA).

Preferred protective colloid-stabilized addition polymers are vinyl ester polymers, (meth)acrylic ester polymers, vinyl chloride polymers and styrene polymers.

The hereinbelow recited polymers are particularly preferred, the weight percentages, if necessary, including the comonomer fraction, adding up to 100% by weight:

from the group of the vinyl ester polymers: vinyl acetate polymers, vinyl acetate-ethylene copolymers having an ethylene content of 1 to 60% by weight; vinyl acetate-ethylene vinyl chloride copolymers having an ethylene content of 1 to 40% by weight and a vinyl chloride content of 20 to 90% by weight; vinyl acetate copolymers with 1 to 50% by weight of one or more co-polymerizable vinyl esters such as vinyl laurate, vinyl pivalate, vinyl esters of an alpha-branched carboxylic acid, especially vinyl versatates (VeoVa9®, VeoVa10®, VeoVa11®), which optionally contain 1 to 40% by weight of ethylene in addition; vinyl acetate-acrylic ester copolymers containing 1 to 60% by weight of acrylic ester, especially n-butyl acrylate or 2-ethylhexyl acrylate, which optionally contain 1 to 40% by weight of ethylene in addition;

from the group of the (meth)acrylic ester polymers: polymers of n-butyl acrylate or 2-ethylhexyl acrylate; copolymers of methyl methacrylate with n-butyl acrylate and/or 2-ethylhexyl acrylate;

from the group of the vinyl chloride polymers (in addition to the abovementioned vinyl ester/vinyl chloride/ethylene copolymers): vinyl chloride-ethylene copolymers and vinyl chloride/acrylate copolymers;

from the group of the styrene polymers: styrene-butadiene copolymers and styrene-acrylic ester copolymers such as styrene-n-butyl acrylate or styrene-2-ethylhexyl acrylate having a styrene content of 10 to 70% by weight in each case.

The polymers are produced in a known manner by an emulsion polymerization process and subsequent drying, for example, spray drying, of the aqueous polymer dispersions obtainable thereby.

The proportion of hydroxyl-containing protective colloid can be added before or during the polymerization, or else after the polymerization; that is, before, during or after the drying step. Particular preference is given to the process described in EP-B 687317 for preparing water-redispersible, protective colloid-stabilized addition polymers, whose disclosure in this respect is incorporated herein by reference. The last procedure mentioned provides the particularly preferred, water-redispersible addition polymers, redispersible meaning that the agglomerates obtained on drying will on addition to water, disintegrate back to the primary particles, which are then dispersed in the water.

The hydroxyl-containing protective colloids generally used for stabilizing the addition polymers are polyhydroxy compounds such as fully or partially hydrolyzed polyvinyl alcohols, water-soluble polysaccharides such as starches (amylose), hydroxyalkyl ether starches, dextrins, cyclodextrins, dextran, xylan and celluloses and also derivatives thereof such as carboxymethyl-, methyl-, hydroxyethyl- and hydroxypropyl-celluloses. By water-soluble is understood in this context that the solubility in water is more than 10 g per liter under standard conditions. Preference is given to one or more partially hydrolyzed polyvinyl alcohols having a degree of hydrolysis of 75 to 99 mol % and a Hbppler viscosity (4% strength in aqueous solution, DIN 53015, method of Hbppler at 20° C.) of 1 to 60 mPas, especially 4 to 35 mpas. The protective colloid fraction is 1 to 30% by weight based on the polymer fraction to be stabilized. Particular preference is given to 8 to 30% by weight.

Solid phenolic resins which can be modified with the pulverulent addition polymer (polymer powder) are also referred to as novolaks and are obtainable by reaction of aldehyde with phenol in-a phenol/aldehyde ratio of greater than 1, usually under acidic conditions. Examples of phenols are, besides phenol itself, its alkyl-substituted derivatives such as the cresols and xylenols, halogen-substituted phenols such as chlorophenol, polyhydric phenols such as resorcinol or pyrocatechol, and also polycyclic phenols such as naphthol and bisphenol A. Examples of useful aldehydes include formaldehyde, paraformaldehyde, acetaldehyde and butyraldehyde. Preference is given to phenol-formaldehyde resins.

Novolaks are mixtures of differently advanced resin complexes composed of methylene-linked polyphenols. Owing to the absence of reactive groups, novolaks are not self-curing, but require a curing agent. Examples of curing agents are paraformaldehyde or hexamethylenetetramine. In general, novolak compositions include 1 to 15% by weight of a curing agent, based on the novolak fraction. Curing by heating causes the chainlike novolak molecules to become crosslinked. To accelerate this crosslinking, the invention utilizes 0.1 to 40% by weight preferably 3 to 40% by weight, more preferably, 10 to 30% by weight, in each case based on the fraction of phenolic resin and polymer powder.

The phenolic resins modified with polymer powder are particularly useful for adhering or consolidating substrates from the group of the natural and synthetic fiber materials. Useful fibers include all raw materials used in the relevant non-woven industry: polyester, polyamide, polypropylene, polyethylene, glass, ceramic, aramid, viscose, carbon, cellulose, cotton, wool or wood fibers and also blends thereof.

The choice of fiber material is not subject to any restriction or preference. The fiber material can be used in the form of fibers, yarns, mats, scrims or as woven textiles (wovens). Preference is given to mats or scrims of polyester, polyamide, polypropylene, polyethylene, aramid, carbon, glass, cellulose, cotton, wool or wood fibers.

Fiber bonding generally utilizes 1 to 50% by weight of bonding powder (phenolic resin +polymer powder), but preferably, 5 to 35% by weight, most preferably, 15 to 30% by weight, in each case based on the total weight of the textile sheet material.

The fiber materials may be consolidated with the phenolic resin composition modified by an addition polymer according to the procedures customary in non-woven technology:

The fibers are blended with the polymer powder-modified phenolic resin compositions in an air stream and the fiber/powder blend is laid down according to the conventional processes of non-woven technology, optionally, carding of the fiber/powder blend, to form a fiber bed. The curing of the powder takes place in the course of an immediately subsequent oven passage, optionally with the use of superheated steam. The oven temperature depends on the residence time of the web in the oven and on the corresponding curing kinetics. The action of shearing forces promotes full curing.

The webs are customarily heated at 110° C. to 180° C., preferably 120° C. to 170° C., especially 130° C. to 160° C., for a period of 30 seconds to 5 minutes, preferably 1 to 4 minutes, especially, 1.5 to 3 minutes. The thus bonded webs may subsequently, if desired, be pressed under a pressure of 1 to 100 bars in a hot press to form shaped articles. This is likewise optionally accomplished with the aid of superheated steam. Mold temperatures are between 150° C. and 250° C. coupled with in-press residence times of 0.25 to 10 minutes.

In one possible embodiment, the polymer powder and the phenolic resin powder are sprinkled as a blend or in succession, in any desired order into a previously laid-down fiber bed, and incorporated into the fiber bed by shaking or needling. If desired, this may be followed by a second web formation step in which an intimate mixture of fibers and powder is laid down as a further web. The powder is cured by the temperature being raised, optionally with the employment of pressure and superheated steam under the above-mentioned conditions.

It is also possible to laminate two or more non-wovens or wovens to each other or one another. To this end, ready-made fiber webs or other substrates are treated with the phenolic resin powder and the polymer powder, subsequently combined at their large surfaces and cross-linked under the above-mentioned conditions, optionally with the additional employment of pressure and superheated steam, at an elevated temperature.

The combination of polymer powder and phenolic resin powder is useful for producing shaped articles from fiber materials and also for producing precursors to such shaped articles, these semi-finished products being known as waddings. Furthermore, it can be employed in bonding the waddings, for example, cushioning, insulating and filter waddings. Preference is further given to laminates or clad products where two identical or two different fibrous structures spread out in sheet fashion are adhered to each other. Examples are insulants in automotive engineering which are composed of reclaimed cotton and which are durably laminated with a surface mat. Preference is also given to laminates where fibrous structures are adhered to non-fibrous substrates. Examples are the adhering of glass fibers onto decorative surface films or panels in the sector of building insulation or the adhering of wovens or other webs to leather in the shoe industry (shoe caps). Preference is further given to laminates of plural superposed fabric layers which are bonded by means of the procedure according to the invention. Examples are two- or more highly layered fabric plies of glass, carbon and/or aramid fiber, which are processible into moldings, if desired.

As well as accelerating the curing, the procedure of the invention provides less brittle moldings owing to the fraction of pulverulent addition polymers.

The examples hereinbelow illustrate the invention.

Examples 1 to 6:

The inventive examples hereinbelow illustrate the acceleration of the curing kinetics of phenolic resins in the presence of the polymer powders. To this end, different polymer powders in combination with phenolic resins were tested with regard to their curative characteristics.

The polymer powders used were:
Polymer powder I: polyvinyl alcohol-stabilized polyvinyl acetate powder
Polymer powder II: polyvinyl alcohol-stabilized vinyl acetate-ethylene copolymer powder
Polymer powder III: polyvinyl alcohol-stabilized vinyl acetate-N-methylolacrylamide copolymer powder
Polymer powder IV: polyvinyl alcohol powder
Comparative polymer powder C: polyvinyl acetate powder
The phenolic resins used were:
Phenolic resin A: a hexanovolak based on phenol and formaldehyde (molecular weight 540 g/mol, particle size 50 µm)
Phenolic resin B: a hexanovolak based on phenol and formaldehyde (molecular weight 510 g/mol, particle size 40 µm)
Experimental procedure:
The polymer powders and the phenolic resins were homogeneously blended in the mixing ratios reported in Table 1. The blend was placed on the hot bench by means of a metal spatula and stirred until the melt had gelled or was no longer brushable. This time was measured with a stopwatch from the sprinkling to the gelling and reported as gel time in seconds. The measurements on the hot bench were carried out at three different temperatures (150° C., 170° C., 190° C.). The results are summarized in Table 1.

The results of Table 1 show the following:
Polyvinyl alcohol-stabilized polymer powders (Inventive Examples 1 to 4) and polvinyl alcohol powder (Inventive Example 6) significantly accelerate the curing of hexanovolaks. Pure polyvinyl acetate powder has no effect (Comparative Example 5).

TABLE 1

| Example | Phenolic resin | Polymer powder | Ratio (g/g) | Gel time in seconds 150° C. | 170° C. | 190° C. |
|---|---|---|---|---|---|---|
| Inv. 1a | A | — | 100/— | 170 | 80 | 40 |
| Inv. 1b | A | I | 95/5 | 115 | 44 | 25 |
| Inv. 1c | A | I | 80/20 | 120 | 55 | 30 |
| Inv. 1d | A | I | 60/40 | 60 | 55 | 30 |
| Inv. 2a | A | — | 100/— | 170 | 80 | 40 |
| Inv. 2b | A | II | 95/5 | 120 | 55 | 35 |
| Inv. 2c | A | II | 90/10 | 120 | 50 | 30 |
| Inv. 2d | A | II | 60/40 | 40 | 35 | 25 |
| Inv. 3a | A | — | 100/— | 170 | 80 | 40 |
| Inv. 3b | A | III | 95/5 | 120 | 50 | 35 |
| Inv. 3c | A | III | 85/15 | 90 | 50 | 30 |
| Inv. 4a | B | — | 100/— | 115 | 55 | 40 |
| Inv. 4b | B | III | 95/5 | 105 | 45 | 35 |
| Inv. 4c | B | III | 75/25 | 85 | 45 | 30 |
| Comp. 5a | A | — | 100/— | 170 | 80 | 40 |
| Comp. 5b | A | V | 75/25 | 195 | 80 | 45 |
| Comp. 5c | A | V | 65/35 | 190 | 95 | 55 |
| Comp. 5d | A | V | 60/40 | 200 | 115 | 70 |
| Inv. 6a | A | — | 100/— | 170 | 80 | 40 |
| Inv. 6b | A | IV | 95/5 | 95 | 50 | 40 |
| Inv. 6c | A | IV | 60/40 | 70 | 50 | 30 |

Examples 7 to 11:

The examples hereinbelow illustrate the production of shaped articles and pressed boards from cotton fibers and the phenolic resin powders modified with cure accelerators. To this end, 107 g of fibers were mixed in each case with 26 g of the corresponding bonding powder preparation, spread out over an area of 24×24 cm and pressed into plyboards. Mold temperature 180° C., press times 0.5, 1, 2 and 4 min, basis weight 2187 g/m², thickness 2 mm.

Table 2 below shows the sag of a sample 10 cm in length and 2 cm in width, which was cut out from the plyboards, under a load of 40 g and at a temperature of 120° C.

Comparative Example 7 shows the heat resistance of moldings consolidated using pure phenolic resin without addition of cure accelerator.

Inventive Examples 8 to 11 describe the behavior of phenolic resin powder modified with cure accelerator. In each case, a significant improvement in heat resistance (=less sag) as a function of the press time chosen is observed.

TABLE 2

| Example | Phenolic resin A | Polymer powder III | Sag in [mm] 0.5 min | 1 min | 2 min | 4 min |
|---|---|---|---|---|---|---|
| Comp. 7 | 100 | — | 79.0 | 34.0 | 12.5 | 14.0 |
| Inv. 8 | 90 | 10 | 59.5 | 11.5 | 11.5 | 16.0 |

TABLE 2-continued

| Example | Phenolic resin A | Polymer powder III | Sag in [mm] | | | |
|---|---|---|---|---|---|---|
| | | | 0.5 min | 1 min | 2 min | 4 min |
| Inv. 9 | 80 | 20 | 85.0 | 24.5 | 13.5 | 9.0 |
| Inv. 10 | 70 | 30 | 85.0 | 24.5 | 12.5 | 19.0 |
| Inv. 11 | 60 | 40 | 75.0 | 57.0 | 27.0 | 11.5 |

What is claimed is:

1. A process for the preparation of a shaped article employing a curable, solid, pulverulent molding composition, comprising:
   contacting a substrate with a dry mixture of;
   a) at least one pulverulent, solid phenolic resin, with;
   b) at least one pulverulent, solid addition polymer selected from polyvinyl alcohol, and from solid hydroxyl functional protective colloid-stabilized addition polymers comprising polymerized moieties selected from vinyl esters of branched or unbranched carboxylic acids of 1 to 12 carbon atoms, the esters of acrylic acid and methacrylic acid with branched or unbranched alcohols of 1 to 12 carbon atoms, vinylaromatics, and vinyl halides, olefins, dienes, and mixtures thereof; and
   curing said curable, solid pulverulent molding composition and substrate into a shaped article.

2. The process of claim 1, wherein said addition polymer comprises one or more of vinyl ester polymers, (meth) acrylic ester polymers, vinyl chloride polymers and styrene polymers.

3. The process of claim 1, employing at least one protective colloid from the group of partially or fully hydrolyzed polyvinyl alcohols, water-soluble polysaccharides, hydroxyalkyl ether starches, dextrins, cyclodextrins, dextran, xylan, celluloses, and derivatized celluloses.

4. The process of claim 1, wherein said pulverulent, solid addition polymers are selected from homopolymeric polyvinyl ester polymers, polyvinyl alcohol polymers, copolymers of vinyl esters and olefins, and mixtures thereof.

5. The process of claim 1, wherein said pulverulent, solid addition polymers are selected from polyvinyl acetate polymers, polyvinyl acetate/ethylene copolymers, and polyvinyl alcohol polymers.

6. The process of claim 1, wherein said protective colloid comprises partially hydrolyzed polyvinyl alcohol.

7. The process of claim 5, wherein said protective colloid comprises partially hydrolyzed polyvinyl alcohol.

8. The process of claim 1, wherein said pulverulent, solid addition polymer comprises at least one of polyvinyl alcohol, polyvinyl acetate stabilized by a partially hydrolyzed polyvinyl alcohol protective colloid, and polyvinyl acetate/ethylene copolymer stabilized by a partially hydrolyzed polyvinyl alcohol protective colloid, wherein said polyvinyl acetate polymer and said polyvinyl acetate/ethylene copolymer may further optionally contain one or more polymerized moieties selected from the group of non-vinyl acetate vinyl esters of branched or unbranched $C_{12}$ or lower carboxylic acids, esters of acrylic acid and methacrylic acid with branched or unbranched alcohols of 1 to 12 carbon atoms, vinylaromatics, and vinyl halides.

9. The process of claim 1, wherein said solid phenolic resin is a novolak resin.

10. The process of claim 1, wherein the curing is effected at a temperature of 110° C. to 180° C. and under a pressure of 1 to 100 bar.

11. The process of claim 1, wherein the substrate used is a natural or synthetic fiber material selected from the group consisting of polyester, polyamide, polypropylene, polyethylene, glass, ceramic, aramid, viscose, carbon, cellulose, cotton, wool or wood fibers and blends thereof.

12. The process of claim 11, wherein the fibers, the pulverulent phenolic resin and the pulverulent addition polymers are blended in an air stream and then cured and processed into a shaped article.

13. The process of claim 1, wherein the pulverulent addition polymer and the pulverulent phenolic resin are sprinkled as a blend or in succession in any desired order into a previously laid-down fiber bed, incorporated into the fiber bed by shaking or needling and then cured and processed into a shaped article.

14. The process of claim 1, wherein two or more ready-made fiber webs and/or wovens are treated with the pulverulent addition polymer and the pulverulent phenolic resin, then combined at their large surfaces and laminated to each other or one another.

15. The process of claim 3, wherein the water-soluble polysaccharrides are starches.

16. The process of claim 3, wherein said derivatized cellulose comprises at least one derivatized cellulose selected from the group of carboxymethyl-, methyl-, hydroxyethyl- or hydroxypropyl-celluloses.

17. A curable composition comprising dry pulverulent solids, suitable for use in the process of claim 1, said composition comprising:
   a) at least one solid, dry pulverulent phenolic resin;
   b) at least one of solid, dry pulverulent polyvinyl alcohol or a hydroxyl-functionai protective colloid-stabilized addition polymer selected from homo- and copolymers of at least one monomer of the group of vinyl esters of branched or unbranched carboxylic acids of 1 to 12 carbon atoms, esters of acrylic acid and methacrylic acid with branched or unbranched alcohols of to 12 carbon atoms, vinylaromatics, vinyl halides, olefins, or dienes.

18. The curable composition of claim 17, wherein b) comprises solid, pulverulent polyvinyl alcohol.

19. The curable composition of claim 17, wherein b) comprises a polyvinyl alcohol protective colloid-stabilized polyvinyl acetate polymer.

20. The curable composition of claim 17, wherein b) comprises a polyvinyl alcohol protective colloid-stabilized polyvinyl acetate/ethylene copolymer.

21. The curable composition of claim 17, wherein said phenolic resin comprises a novolac resin.

* * * * *

UNITED STATES PATENT AND TRADEMARK OFFICE
CERTIFICATE OF CORRECTION

PATENT NO. : 6,440,255 B1  
DATED : August 27, 2002  
INVENTOR(S) : Klaus Kohlhammer and Claudia Schmidt It is certified that error appears in the above-identified patent and that said Letters Patent is hereby corrected as shown below:

<u>Column 8,</u>
Line 41, "functionai" should be -- functional --.

Signed and Sealed this

Twenty-eighth Day of January, 2003

JAMES E. ROGAN
*Director of the United States Patent and Trademark Office*